March 25, 1930.  V. A. SMITH ET AL  1,751,892
DEVICE FOR SHAPING BATTERY SEPARATORS
Filed Sept. 8, 1925
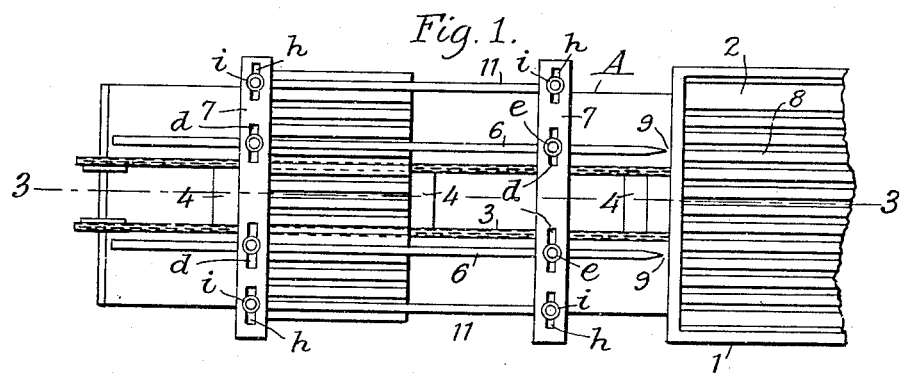
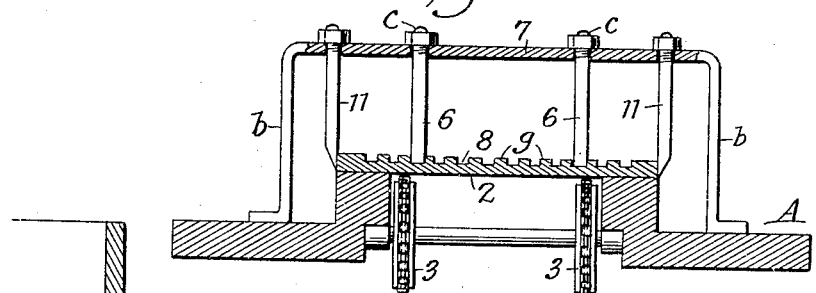
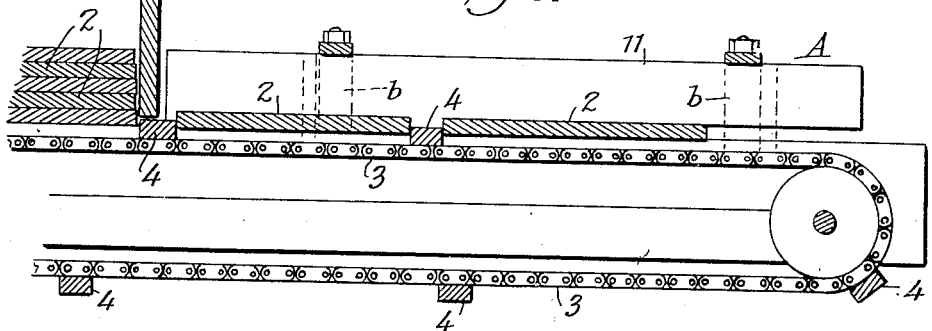
INVENTOR.
Vernon A. Smith,
Charles Backman,
BY Harry C. Schroeder
ATTORNEY.

Patented Mar. 25, 1930

1,751,892

UNITED STATES PATENT OFFICE

VERNON A. SMITH, OF BERKELEY, AND CHARLES BACKMAN, OF OAKLAND, CALIFORNIA

DEVICE FOR SHAPING BATTERY SEPARATORS

Application filed September 8, 1925. Serial No. 55,033.

The invention is for improvements in devices for shaping battery separators having one or both faces corrugated which results in the provision of alternate beads and grooves and are usually made of wood and rectangular in outline.

The primary object of the invention is to provide a device which will trim the edges of the separators in a line parallel to and at a predetermined distance from the beads.

The invention contemplates the shaping or trimming of battery separators by automatic means by which the battery separators may be so positioned on a cutting table and the cutting blades so adjusted as to accurately cut or trim the edges of a battery separator on a predetermined line parallel to the median line of the separator.

As illustrated in the drawings; Figure 1 shows a plan view of the device associated with means for automatically feeding separator plates to the cutting blades.

Figure 2 is an end view of Fig. 1.

Figure 3 is a section taken on line 3—3 of Fig. 1 with the guides omitted.

Figure 4 is an end view of a battery separator.

Referring to Figure 1 the cutting table as an entirety is designated by reference character A which may be provided with any suitable means of support. Adjusting plate 7 is supported by spaced apart standards $b$ and above the cutting table A. Depending guides 6 are provided with screw-threaded studs $c$ at their upper ends which extend through elongated slots $d$ and receive thereon tensioning nuts $e$ for adjusting the guides transversely of the cutting table A for positioning the guides within grooves 8 of the separator plate 2 in order to hold the separator plate firmly in position for the trimming operation thereof by blades 11. Guides 6 are preferably pointed at their ends as at 9 for the purpose of compensating for any slight mal-adjustment of the separator plates with relation to the end of the guides. A plurality of separators 2 are stacked one upon another in a magazine 1 having spaced apart flanges extending inwardly and transversely of the table A for supporting the separators which are engaged one at a time successively and upwardly beginning with the bottom separator by pusher blocks 4 which are secured at their respective ends to belt chains 3 and are drawn upon the table A against the cutting blades 11 for shearing their longitudinal edges.

It will be noted by reference to Figure 1 that the battery separators 2 as shown in the magazine are of greater width than the distance between the parallel cutting blades 11, located at the respective sides of the table and hence when the bottom plate of the stack is forced against the cutting blades 11 the opposite longitudinal edges of the plate will be sheared therefrom by the cutting blades on a line in exact parallelism with the beads $g$ of the separator 2. Cutting blades 11 are also provided with screw-threaded studs extending upwardly through elongated slots $h$ adjacent the respective ends of adjusting plate 7 and are provided with tensioning nuts $i$ for securing the blades in adjusted position transversely of the table A so that the trimming of the separator to the desired width may be readily accomplished by the unscrewing of the tensioning nuts $i$ and shifting the blades 11 transversely of the bed A to the desired position and then retightening the nuts $i$.

Having thus described the invention, what is claimed is:

1. A device for shaping battery separators having corrugated faces comprising a cutting table, spaced apart stationary blades carried by the cutting table, a battery separator magazine positioned at one end of the table, a conveyer for moving the separators from the magazine and into cutting engagement with the blades and guides for engaging the grooves of a corrugated face of the separator during the shaping thereof by the cutting blades.

2. A device for shaping battery separators having a corrugated face comprising a cutting table, spaced apart stationary blades carried by the cutting table, said blades being adjustable transversely of the table, a separator magazine supported by the cutting table, a conveyer for engaging a battery separator within the magazine and passing it over the table and in engagement with the cutting blades, dependent guides carried by the cutting table capable of slidable engagement within the grooves of the corrugated face of the battery separator, said guides being adjustable transversely of the cutting table and means for securing the guides and the cutting blades in adjusted position.

3. A device for shaping battery separators having a corrugated face comprising a cutting table, spaced apart adjustable stationary cutting blades carried by the table, an adjusting plate having elongated slots therethrough above and spaced from the cutting table, said blades having studs passing through slots in the adjusting plate, dependent adjustable guides having studs passing through slots of the adjusting plate for engaging the grooves of the corrugated face of a separator, means for securing the blades in adjusted position within the slots, means for securing the guides in adjusted position within the slots, a separator magazine supported by the cutting table, a conveyer for drawing a separator from the magazine and into cutting engagement with the blades.

4. A device for shaping battery separators having a corrugated face, comprising a cutting table, spaced apart stationary blades carried by the cutting table, means for adjusting said blades transversely of the cutting table, a conveyor for moving the separators into cutting engagement with the blades and guides for engaging the grooves of the corrugated face of the separator during the shaping thereof by the cutting blades.

In testimony whereof we affix our signatures.

VERNON A. SMITH.
CHARLES BACKMAN.